Patented Dec. 24, 1929

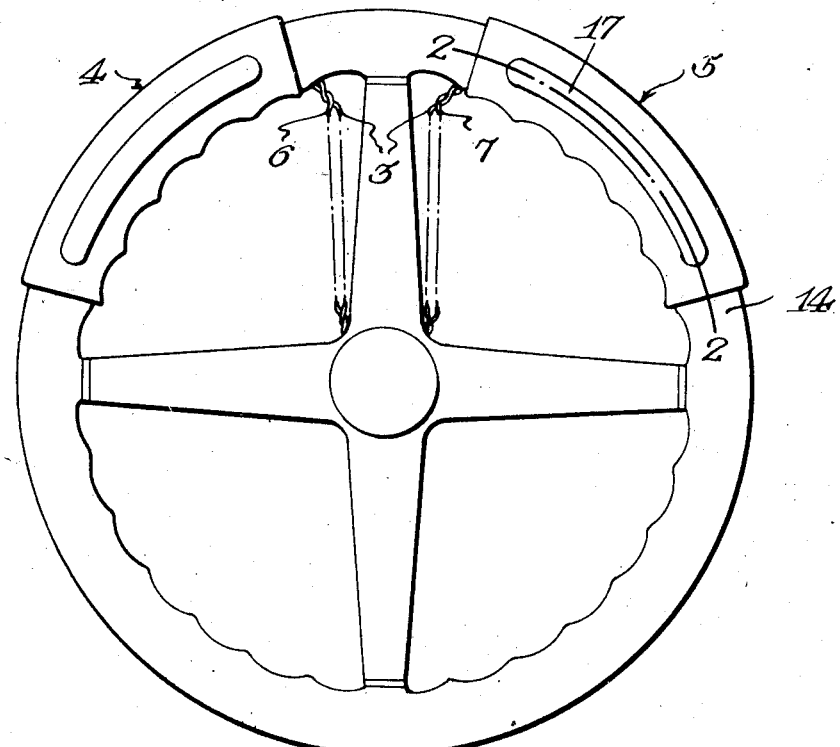

1,740,634

UNITED STATES PATENT OFFICE

JULES L. WETTLAUFER, OF BELMONT, MASSACHUSETTS

VEHICLE INDICATOR SWITCH

Application filed July 19, 1927. Serial No. 206,883.

This invention relates to a switch designed to be associated with the steering wheel of a vehicle, and more particularly to a switch or pair of switches adapted to be placed on the steering wheel of an automobile for operating a pair of signals for the purpose of indicating to persons following the car in which direction it is to turn.

Among the objects of the invention are to provide a switch capable of being applied to a completed steering wheel without requiring the services of a skilled mechanic in installing it and without necessitating any change in the structure of the wheel, thus also providing a device which may be applied during the process of manufacture of the automobile without requiring a change in the design of the wheel; to provide a switch which may be closed to complete a signal operating circuit without special care on the part of the operator as to what point he touches, thus not interfering with his driving; to provide a pair of switches so placed that the driver will operate them to operate the signals in the ordinary acts of driving the car and without conscious effort; and to provide a switch of material which has sufficient resilience to prevent accidental closing. Other purposes and objects of the invention will be apparent as the description of one form of the invention proceeds and will be pointed out in the appended claims.

In the accompanying drawings:

Fig. 1 is a plan view of the steering wheel showing the switches in position;

Fig. 2 is a section on the line 2—2 in Fig. 1;

Fig. 3 is a section on the line 3—3 in Fig. 2;

Fig. 4 is a section on the line 4—4 in Fig. 2; and

Fig. 5 is a diagram of a circuit in which the switches may be used.

Referring first to Fig. 5, a battery or other source of electrical energy is indicated at 1, one terminal of which may be grounded as shown at 2 and the other connected by a wire 3 to one contact of each of the switches indicated diagrammatically at 4 and 5. The other contacts of the switches are connected by wires 6 and 7 respectively to the indicating devices here shown as lamps 8 and 9, the remaining terminal of each of the lamps being grounded as shown at 10 and 11. A manually operated switch may be inserted in one of the wires connected to the lamps as shown, for example, at 12 and 13.

The switches are preferably upon the upper left and right hand quarters of the rim 14 of the steering wheel, Fig. 1, the wires from these switches being conducted from the wheel to the signals in any desired manner, as for example, by making the steering column hollow and passing the wires down through the center and thence through the body of the car.

Each switch is made up of a sleeve-like member 15 which is initially open so that it may be wrapped around the rim of the steering wheel and have its longitudinal edges fastened together in any suitable manner, as for example, by beveling them as shown in Figs. 3 and 4 at 16 and applying cement to hold these beveled surfaces together. Member 15 is preferably made of resilient flexible material such as soft gum rubber and has therein an elongate struck-up portion 17 providing a groove 18 in its inner side adapted to receive a resilient conducting member 19, which extends longitudinally of the sleeve and has its ends fastened therein by collar or band members 20 and 21. One wire of the above described or other circuit may be attached to either one of the end band members 20 or 21, thus constituting the strip member 19 one contact point of the switch, there being at the center portion of the strip a projection 22 formed by a U-shaped bend, which projection is adapted to contact with a band 23 which is fitted in an annular groove in the sleeve 15 similar to bands 20 and 21 and constitutes the other contact member of the switch.

From the above description the mode of operation is obvious, that is, whenever any part of the sleeve member is gripped by the operator, the projection 22 of the resilient member 19 will contact with the band 23 closing the circuit and actuating the respective signal to indicate which way the automobile is to be turned. It is immaterial if the sleeve 15 be rotated relative to the rim 14 as the band 23 and the strip 19 are both fixed with respect to the sleeve. The resilience of the rubber acts in tandem with that of the member 19 to prevent accidental closing of the switch.

Inasmuch as changes may be made in various details of the device without departing from the spirit of the invention, for example, the substitution of other types of signals for the lights illustrated in the drawings, I do not wish to be limited except by the scope of the appended claims.

I claim:

1. In combination with the steering wheel of a vehicle, an electric switch comprising an open rubber sleeve member adapted to be applied to the rim of the steering wheel, a band of conducting material fixed therein, the sleeve member having associated therewith two spaced split metallic bands connected by a longitudinally extending strip of spring metal placed so that the first mentioned band is spaced substantially midway between the other two, the sleeve being held in position by fastening together the longitudinal edges thereof, an electric circuit, and means to connect one of the terminals of the circuit to the center band and the other to one of the end bands, the strip of spring metal contacting with the center band only when the rubber sleeve is gripped.

2. In an electric circuit a switch device adapted to be mounted on a steering wheel, comprising a sleeve of resilient material having an outer longitudinal protuberance and a corresponding groove in its inner surface, and a pair of contacts in said groove, one of said contacts being fixed with respect to the sleeve and the other contact being movable with respect to the first named contact and being normally urged away from said contact and toward the resilient material at the base of the groove, so that the two contacts become engaged upon the application of hand pressure on said sleeve protuberance.

3. In an electric circuit a switch device adapted to be mounted on a steering wheel, comprising a sleeve of resilient material embracing the rim of the steering wheel and presenting a substantially smooth outer surface, said sleeve having an outer longitudinal protuberance and a corresponding underlying groove in its inner surface, a leaf spring constituting a contact member disposed longitudinally within said groove, a second contact member embedded in the inner surface of the body of said sleeve and traversing said groove, and means for resiliently holding the spring away from the second contact member, whereby the contacts may be closed together upon the application of hand pressure on the outer surface of the sleeve and its protuberance.

Signed by me at Belmont, Massachusetts, this 27th day of June, 1927.

JULES L. WETTLAUFER.